(12) United States Patent
Das et al.

(10) Patent No.: US 11,481,172 B2
(45) Date of Patent: Oct. 25, 2022

(54) METHOD AND APPARATUS FOR PROVIDING AN INTELLIGENT RESPONSE

(71) Applicant: Samsung Electronics Co., Ltd., Suwon-si (KR)

(72) Inventors: Kaushik Das, Bengaluru (IN); Mayank Kumar Tyagi, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/423,667

(22) Filed: May 28, 2019

(65) Prior Publication Data

US 2019/0361655 A1   Nov. 28, 2019

(30) Foreign Application Priority Data

May 25, 2018 (IN) .............................. 201841019725
May 22, 2019 (IN) ............................. 2018 41019725

(51) Int. Cl.
| | |
|---|---|
| *G06F 3/16* | (2006.01) |
| *G06F 3/01* | (2006.01) |
| *G06F 3/14* | (2006.01) |
| *G06N 3/00* | (2006.01) |
| *G09G 5/10* | (2006.01) |

(Continued)

(52) U.S. Cl.
CPC ................ *G06F 3/14* (2013.01); *G06F 3/016* (2013.01); *G06F 3/167* (2013.01); *G06N 3/004* (2013.01); *G09G 5/10* (2013.01); *H04L 67/01* (2022.05); *G06F 3/0488* (2013.01)

(58) Field of Classification Search
CPC . G06F 3/14; G06F 3/016; G06F 3/167; G06F 3/0488; G10L 15/22; G10L 2015/223; H04L 67/42
See application file for complete search history.

(56) References Cited

U.S. PATENT DOCUMENTS

| | | |
|---|---|---|
| 8,019,486 B2 | 9/2011 | Rawls-Meehan |
| 9,728,188 B1 | 8/2017 | Rosen et al. |

(Continued)

FOREIGN PATENT DOCUMENTS

| | | |
|---|---|---|
| KR | 10-2018-0069355 A | 6/2018 |
| WO | 2011-020478 A1 | 2/2011 |
| WO | 2018-005334 A1 | 1/2018 |

OTHER PUBLICATIONS

International Search Report dated Sep. 9, 2019, issued in an International application No. PCT/KR2019/006333.

(Continued)

*Primary Examiner* — Nhat Huy T Nguyen
(74) *Attorney, Agent, or Firm* — Jefferson IP Law, LLP

(57) ABSTRACT

A method of providing an intelligent response on an electronic device and an apparatus therefor are provided. The method includes receiving a command from a user of the electronic device, analyzing the command, generating, based on the analyzed command, at least one intelligent response corresponding to the command and an actual response corresponding to the command, the at least one intelligent response including at least one of a sound effect associated with the command, a vibration effect associated with the command, or a visual effect associated with the command, and outputting the at least one intelligent response and the actual response by the electronic device.

20 Claims, 17 Drawing Sheets

(51) Int. Cl.
*H04L 67/01* (2022.01)
*G06F 3/0488* (2022.01)

(56) References Cited

U.S. PATENT DOCUMENTS

| | | | |
|---|---|---|---|
| 2006/0054051 A1* | 3/2006 | Webster | A63H 19/14 |
| | | | 105/1.5 |
| 2007/0003913 A1* | 1/2007 | Rosenberg | G09B 19/06 |
| | | | 434/156 |
| 2014/0039900 A1 | 2/2014 | Heubel et al. | |
| 2016/0055806 A1 | 2/2016 | Lozovoy | |
| 2017/0116990 A1 | 4/2017 | Faaborg et al. | |
| 2017/0242653 A1* | 8/2017 | Lang | H04S 7/303 |
| 2017/0357637 A1 | 12/2017 | Nell et al. | |
| 2018/0092189 A1 | 3/2018 | Reier et al. | |
| 2018/0096688 A1 | 4/2018 | Kim et al. | |

OTHER PUBLICATIONS

Control Your Lights with Siri! (HomeKit+LIFX), XP 054981505, https://www.youtube.com/watch?v=allGn41ELes, Sep. 21, 2017.
European Search Report dated Mar. 17, 2021, issued in European Patent Application No. 19806573.2.
European Office Action dated Aug. 10, 2022, issued in European Patent Application No. 19806573.2.

* cited by examiner

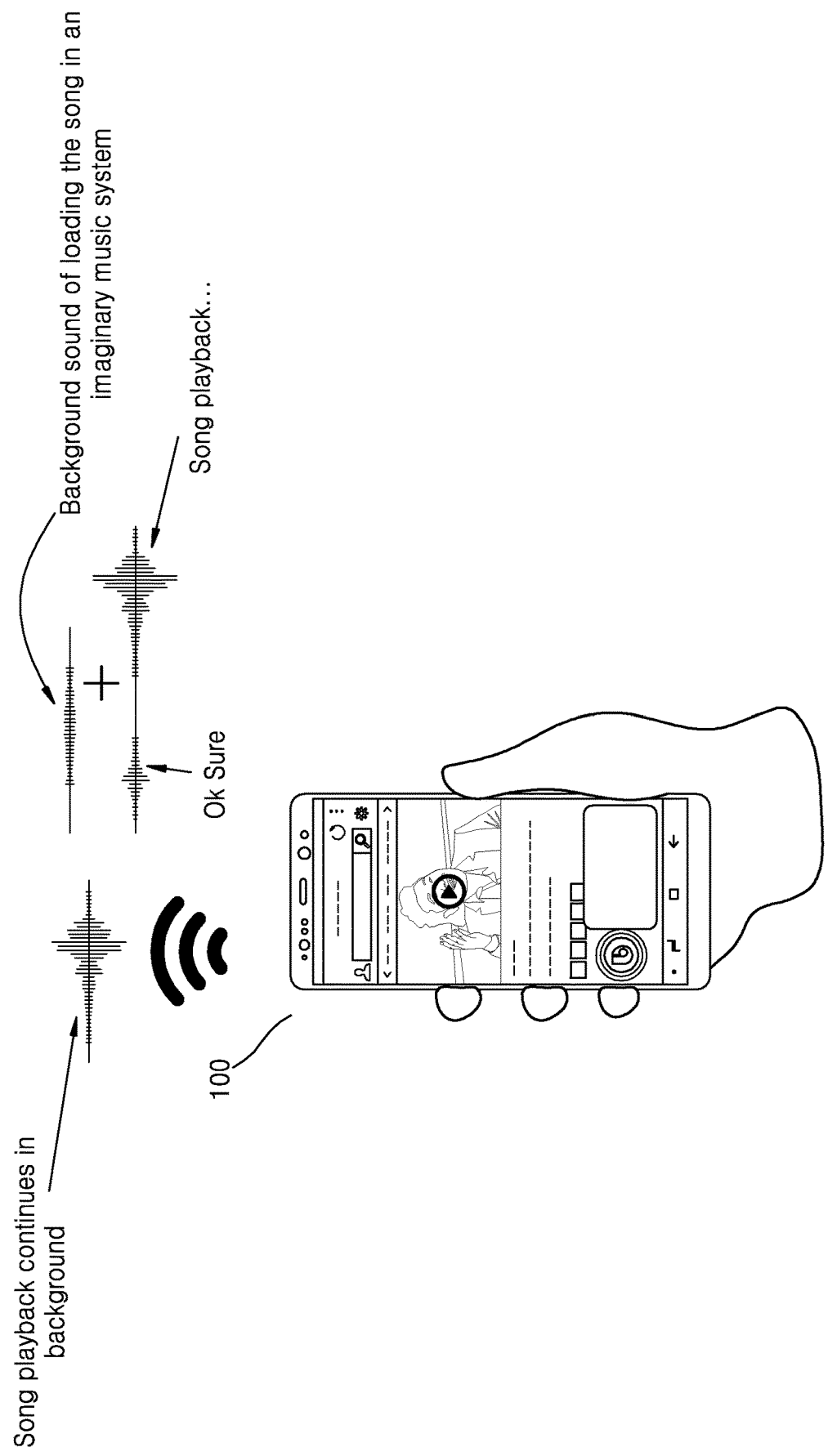

METHOD AND APPARATUS FOR PROVIDING AN INTELLIGENT RESPONSE

CROSS-REFERENCE TO RELATED APPLICATION(S)

This application is based on and claims priority under 35 U.S.C. § 119 of an Indian patent application number 201841019725, filed on May 25, 2018, in the Indian Patent Office, and of an Indian patent application number 201841019725, filed on May 22, 2019, in the Indian Patent Office, the disclosure of each of which is incorporated by reference herein in its entirety.

BACKGROUND

1. Field

The disclosure relates to user experiences between a user and an electronic device of the user. More particularly, the disclosure relates to a method and an apparatus for managing a fake response to the user by the electronic device.

2. Description of Related Art

Generally, a user executes one or more commands on an application installed in an electronic device. The command can be, for example, but not limited to, a voice command, a text input, a touch input or the like. In an example, the user of the electronic device provides the voice command to an application (e.g., smart assistant application, virtual assistance application or the like) to perform a certain action. The command is used to control some devices or to perform certain actions via some applications (e.g. setting alarm, setting a reminder etc.). After an execution of the command, the user may receive a feedback (or an execution report) through a user interface. Generally, the feedbacks from a device are notifications or pop-ups.

Thus, it is desired to address the above mentioned disadvantages or other shortcomings or at least provide a useful alternative.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of providing an intelligent response on an electronic device.

Additional aspects will be set forth in part in the description which follows and, in part, will be apparent from the description, or may be learned by practice of the presented embodiments.

In accordance with an aspect of the disclosure, a method of providing an intelligent response on an electronic device is provided. The method includes receiving a command from a user of the electronic device, analyzing the command, generating, based on the analyzed command, at least one intelligent response corresponding to the command and an actual response corresponding to the command, the at least one intelligent response including at least one of a sound effect associated with the command, a vibration effect associated with the command, or a visual effect associated with the command, and outputting the at least one intelligent response and the actual response by the electronic device.

In an embodiment, the command includes at least one of a voice command, a text command, a touch input command or an image input captured by a capturing device.

In an embodiment, the outputting the at least one intelligent response and the actual response includes outputting the at least one intelligent response and the actual response in a temporal order or simultaneously.

In an embodiment, the generating of the at least one intelligent response includes transmitting, to a server, a request of the at least one intelligent response and the analyzed command, and receiving the at least one intelligent response from the server.

In an embodiment, the actual response corresponding to the command comprises a control signal to be transmitted to at least one remote device for controlling, in response to the command, the at least one remote device.

In an embodiment, the generating of the at least one intelligent response corresponding to the content of the command comprises generating the at least one intelligent response based on the analyzed content of the command and information associated with the command, the information being obtained from an application installed in the electronic device or a server connected to the electronic device.

In an embodiment, the visual effect associated with the command includes a visual effect of changing the brightness of a display of the electronic device.

In an embodiment, the moving image associated with the command comprises moving images depicting the command.

In an embodiment, the analyzing of the command comprises obtaining information associated with the command from a database via a network.

In an embodiment, the visual effect comprises displaying a still or a moving image associated with the command.

In an embodiment, the generating of the at least one intelligent response to the command includes searching a network for first data required to generate the at least one intelligent response and generating the at least one intelligent response based on the first data.

In an embodiment, the generating of the actual response includes searching the network for second data required to generate the actual response and generating the actual response based on the second data.

In accordance with another aspect of the disclosure, an apparatus for providing an intelligent response is provided. The apparatus includes a display, a speaker, at least one processor configured to receive a command from a user, analyze the command, generate, based on the analyzed command, at least one intelligent response corresponding to the command and an actual response corresponding to the command, the at least one intelligent response including at least one of a sound effect associated with the command outputted by the speaker, a vibration effect associated with the command, or a visual effect associated with the command, and output the at least one intelligent response and the actual response.

In an embodiment, the at least one processor is configured to transmit, to a server, a request of the at least one intelligent response and the analyzed command, and receive the at least one intelligent response generated by the server.

In an embodiment, the visual effect associated with the command comprises a visual effect of changing the brightness of the display of the electronic device.

In an embodiment, the at least one processor is further configured to transmit, to at least one illumination device, a signal to change the brightness of the at least one illumination device proportional to the visual effect of changing the brightness of the display of the apparatus.

In an embodiment, the at least one processor is further configured to search a network for first data required to generate the at least one intelligent response and generate the intelligent response based on the first data.

In an embodiment, the at least one processor is further configured to search the network for second data required to generate the actual response and generate the actual response based on the second data.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 17 illustrates an example scenario in which an intelligent response associated with playing a song is provided, according to an embodiment of the disclosure.

Throughout the drawings, it should be noted that like reference numbers are used to depict the same or similar elements, features, and structures.

DETAILED DESCRIPTION

Figure 1:
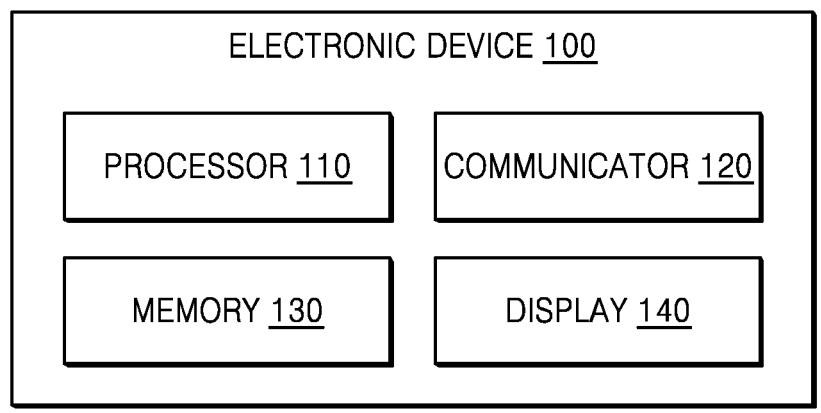
FIG. 1 is a bock diagram of an electronic device 100 for providing an intelligent response, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "1st" or "first" and "2nd" or "second" may use corresponding components regardless of importance or order and are used to distinguish one component from another without limiting the components.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein disclose a system for providing an intelligent response. The system includes a server communicated with an electronic device. The electronic device is configured to receive a command from a user and send the command to the server. The server is configured to receive the command from the electronic device and dynamically create a response to the command, wherein the feedback imitates the content or the characteristics of the command received from the electronic device. The server is configured to transmit the feedback corresponding to the command to the electronic device while the electronic device is executing the command or once the electronic device executed the command. Further, the electronic device is configured to receive the response to the command and provide the response to the user while executing the command or once the command is executed. Further, the electronic device is configured to provide a surreal or an intelligent response for the command once the command is executed. In an embodiment, the surreal or the intelligent response corresponds to create at least one of an imaginary response, a virtual response, and an augmentable virtual effect for the command.

Unlike methods and systems of the related art, the proposed system can be used intelligently augments one or more special effects (e.g., audio effect, video effect, vibration effect, or the like) while providing an intelligent response to a current command or an event occurrence through the electronic device. These special effects are produced with an actual command execution or the event occurrence. The intelligent response may increase the user experience while providing the actual command execution or the event occurrence.

The system intelligently associates special effects to generate a completely imaginary situation that mingles certain effects associated with the user input or an event with the action being performed. The system intelligently provides a more real-world like execution experience corresponding to the command intended by a user. While generating certain effects, the system intelligently associates plurality of attributes (e.g., capability of the electronic device, a location of the electronic device or the like) of involved underlying elements of entities related to various use case (e.g., a location of IoT illumination devices, a number of the illumination devices in that location, brightness of the illumination device, etc. The effects are produced based on capabilities of the electronic device with which the user is interacting. The effects can be, but not limited to, an audio effect, a visual effect, a physical (e.g., vibration) effect, or a combination thereof. Before producing the effects, the system intelligently checks if providing the effects makes sense to the user and does not annoy the user with redundant or unnecessary effects. For example, the user provides the command of "virtual assistant! Close the garage door". In response to the voice command, the electronic device determines whether the user is located close to the garage. In order to control the degree of the effects to be provided, the electronic device may have or obtain, with a GPS module included in the electronic device, the location information of the user and the garage location which is associated with the actual command. If the user is determined to be located close to the garage, the electronic device generates the background sound of closing the garage door in a less volume. If the user is relatively away from the garage, the electronic device generates the background sound of closing the garage door in a large volume.

The system can be used to intelligently augment or combine one or more special effects while providing the feedback or the intelligent response about a command input by the user or an event occurrence through the electronic device.

Referring now to the drawings, and more particularly to FIGS. 1 through 17, where similar reference characters denote corresponding features consistently throughout the figures, there are shown preferred embodiments.

Throughout the specification, the terms of "feedback" and "surreal response" may be used interchangeably with the terms of "actual response" and "intelligent response", respectively.

FIG. 1 is a bock diagram of an electronic device 100 for providing an intelligent response, according to an embodiment of the disclosure.

Referring to FIG. 1, the electronic device 100 can be, for example, but not limited to a cellular phone, a smart phone, a personal digital assistant (PDA), a tablet computer, a laptop computer, a music player, a video player, an Internet of things (IoT) device or the like. The intelligent response can be, for example, but not limited to a virtual response, an imaginary response, an augmentable virtual effect or the like.

In an embodiment, the electronic device 100 may include a processor 110, a communicator 120, a memory 130, and a display 140. The processor 110 may be coupled with the memory 130, the communicator 120 (e.g., a transceiver) and the display 140.

In an embodiment, the processor 110 is configured to receive a command from a user. The command can be, for example, but not limited to a voice command, a text command, a physical command such as swinging the electronic device, an IoT command, a touch input or the like. The processor 110 may be able to handle any mode of command. After receiving the command, the processor 110 may be configured to parse and analyze the content or the intent included in the command.

Based on the analysis result, the processor 110 may determine and generate an actual response and an intelligent response specific to the command. The actual response to the command may imitate the content or the characteristics of the command received from the user. For example, if the command is "Volume up!", then the actual response may be an action of turning up the volume or a control signal to control a speaker of the electronic device 100 or a speaker of a remote device to turn up the volume.

In an embodiment, the intelligent response imitating the action of the command may be determined by determining the characteristics of the command, wherein the characteristics of the command indicates a topic and/or an action to be performed by an application (e.g., virtual assistant application, an IoT application or the like), determining at least one of capabilities of the electronic device 100. The processor 110 may generate the intelligent response to the command based on the at least one of the characteristics of the command or the capabilities of the electronic device 100.

Further, the processor 110 may provide the intelligent response specific to the command while executing the actual response to the command or before or after the actual response is executed. When the command is executed, the processor 110 may provide the intelligent response corresponding to the command. The intelligent response to the command, can be, for example, but not limited to an audio effect, a visual effect, a physical effect, an audio-visual effect, or an audio-visual-physical effect.

The at least one of the audio effect, the visual effect, the physical effect, the audio-visual effect, and the audio-visual-physical effect are generated based on resource detail and an effect property. The audio effect, the visual effect, the physical effect, the audio-visual effect, and the audio-visual-physical effect is provided by combining at least two of the foregoing effects.

In an embodiment, the processor 110 may obtain the content of the command and parse the content of the command to determine what corresponding action (control) and/or effects will be appropriate for the command. Further, the processor 110 may determine a command type. That is, the processor 110 may determine whether the command is a voice command, a text command, a touch input command or an image input captured by an image capturing device. The processor 110 may obtain a voice command execution metadata, a visual command execution metadata, a physical command execution metadata based on the command type. The processor 110 may dynamically determine an actual and intelligent response imitating the action or the content of the command based on the voice command execution metadata, the visual command execution metadata, and the physical command execution metadata.

The processor 110 may execute instructions stored in the memory 130 and perform various processes. The communicator 120 is configured for communicating internally between internal hardware components and with external devices via one or more networks. In an embodiment, the communicator 120 is configured for communicating with the server (not shown).

Further, the memory 130 stores and updates a target knowledgebase based on the command executed in the electronic device 100. The target knowledgebase contains details about a command output and keeps updating the command output over the period of time. Further, the memory 130 stores the intelligent response.

Further, the memory 130 stores information about of all kinds of intelligent responses. The memory 130 maintains information about resources (e.g., sound files, pattern files or the like) applicable to the intelligent response. The property of each the intelligent response is maintained in various formats (e.g., json format or the like). In an example, in case of visual effects, the visual effects may contain information such as an address of a code to be executed while creating the visual effect. The address of a code could be a local address reference or reference to some remote cloud location. In another example, during visual scene creation operations, the code information is used to generate the parameters related to visual components (i.e., video frames). While playing the scene, an effect composer (not shown) creates the visual effects using a display sub-system of the electronic device 100 on which the surreal response is provided/played.

The memory 130 stores instructions to be executed by the processor 110. The memory 130 may include non-volatile storage memory. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In some examples, the memory 130 can be configured to store larger amounts of information than the memory. In certain examples, a non-transitory storage medium may store data that can, over time, change (e.g., in random access memory (RAM) or cache).

Although FIG. 1 shows various hardware components of the electronic device 100 but it is to be understood that other embodiments are not limited thereon. In other embodiments, the electronic device 100 may include less or more components. Further, the labels or names of the components are used only for illustrative purpose and does not limit the scope of the disclosure. One or more components can be combined together to perform same or substantially similar function to provide the surreal response in the electronic device 100.

Figure 2:
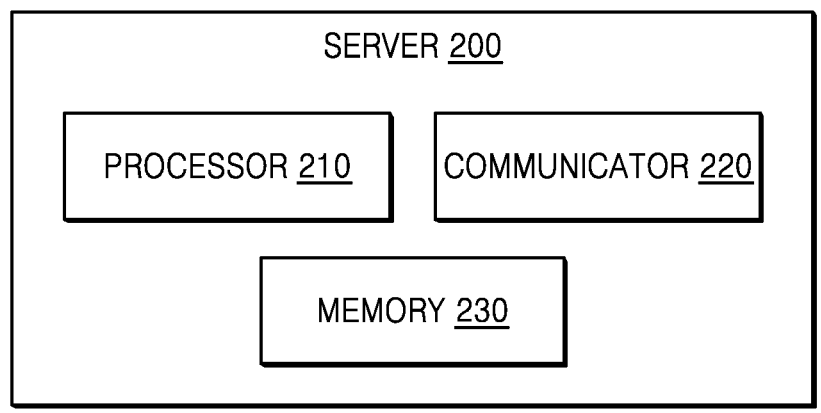
FIG. 2 is a block diagram of the server 200 for the intelligent response, according to an embodiment of the disclosure.

FIG. 2 is a block diagram of the server 200 for the intelligent response, according to an embodiment of the disclosure.

Referring to FIG. 2, the server 200 may include a processor 210, communicator 220 (e.g., a transceiver), and a memory 230. The processor 210 may be coupled to the memory 230 and/or the communicator 220.

In an embodiment, when the electronic device 100 is not capable of processing the command input by a user for providing an intelligent response due to the resource limitation, the electronic device 100 may connect to the server 200 for obtaining the intelligent response. The processor 210 of the server 200 may receive the command from the electronic device 100 via the communicator 220. After receiving the command from the electronic device 100, the processor 210 is configured to generate the feedback specific to the command. The feedback specific to the command imitates the content or the characteristics of the command as described referring to FIG. 1.

The actual response specific to the command is dynamically created by determining the characteristics of the command which indicates the topic and/or the action to be performed at the electronic device 100, determining the capabilities of the electronic device 100 on which the command needs to be executed. The server 200, based on the characteristics of the command and the capabilities of the electronic device 100 and/or the server 200, generates the actual response specific to the command and the intelligent response specific to the command.

In an example, the capability may include communication capability in an IoT cloud environment, a location of the server 200 or the electronic device 100, a storage capacity, a display capability, a speaker capability, and a vibration capability. In an example, if the user has an old mobile phone, the display effect for the old mobile phone is different from a new mobile phone. Further, the electronic device 100 provides the intelligent response by adjusting audio level based on the user preferences or any information including the capability of the server 200 or the electronic device 100. The user preference may be updated over a period of time. In an example, the intelligent response may be related to an old fan, the volume of the old fan is adjusted automatically.

After generating the intelligent response, the processor 210 may transmit the intelligent response corresponding to the command to the electronic device 100 while the electronic device 100 is executing the actual response or before/after the electronic device 100 has executed the actual response specific to the command.

The processor 210 is configured to execute instructions stored in the memory 230 and to perform various processes. The communicator 220 is configured for communicating internally between internal hardware components and with external devices via one or more networks. Further, the communicator 220 is configured for communicating with the electronic device 100.

In an embodiment, the electronic device 100 may generate the actual response specific to the command internally, and may obtain the intelligent response from the server 200.

The memory 230 stores and updates the target knowledgebase based on the various command executed in the server 200. The target knowledgebase contains the details about the command output and keeps updating the command output over the period of time. The memory 230 stores the intelligent response. The memory 230 stores information about of all kinds of the intelligent response. The memory 230 maintains information about resources (e.g., sound files, pattern files or the like) applicable to the particular effect.

The memory 230 stores instructions to be executed by the processor 210. The memory 230 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 230 may, in some examples, be considered a non-transitory storage medium. The term "non-transitory" may indicate that the storage medium is not embodied in a carrier wave or a propagated signal. However, the term "non-transitory" should not be interpreted that the memory 230 is non-movable. In some examples, the memory 230 can be configured to store larger amounts of information than the memory. In certain examples, a non-transitory storage medium may store data that can, over time, change (e.g., in random access memory (RAM) or cache).

Although the FIG. 2 illustrates various hardware components of the server 200 but it is to be understood that other embodiments are not limited thereon. In other embodiments, the server 200 may include less or more components. Further, the labels or names of the components are used only for illustrative purpose and does not limit the scope of the disclosure. One or more components can be combined together to perform same or substantially similar function to provide the surreal response in the electronic device 100.

Figure 3:
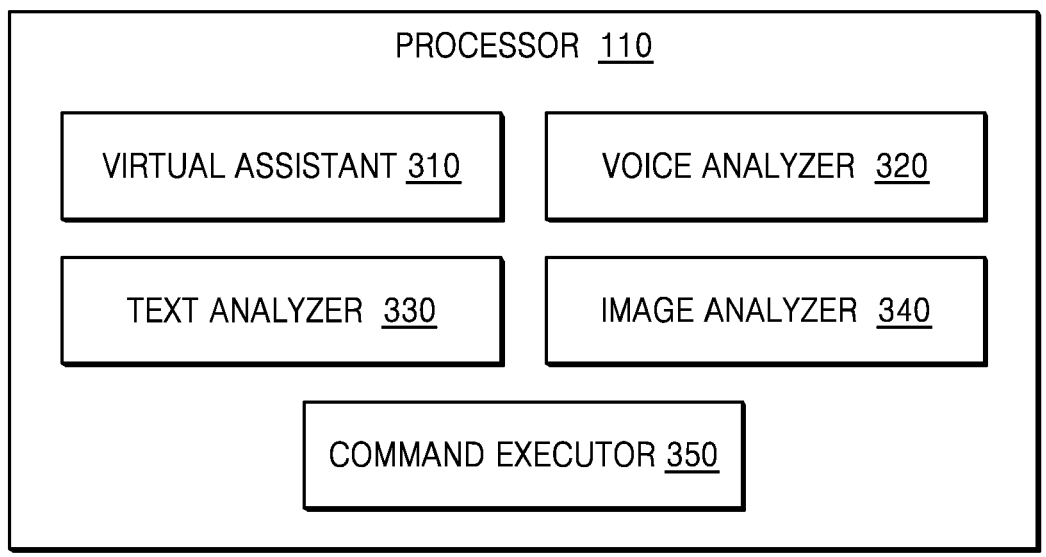
FIG. 3 illustrates various elements in the processor 110 of the electronic device 100, according to an embodiment of the disclosure.

FIG. 3 illustrates various elements in the processor 110 of the electronic device 100, according to an embodiment of the disclosure.

Referring to FIG. 3, the processor 110 may include a virtual assistant 310, a voice analyzer 320, a text analyzer 330, an image analyzer 340, and a command executor 350. The virtual assistant 310, the voice analyzer 320, the text analyzer 330, the image analyzer 340 and the command executor 350 may be implemented as at least one hardware processor.

The virtual assistant 310 may launch a virtual assistance application and receive a user input including a command. The voice analyzer 320 may analyze a voice command from a user of the electronic device 100. The voice analyzer 320 may extract recognizable words and phrases from the voice command. In an embodiment, if the voice analyzer 320 receives voice command of "What is the schedule today?", the voice analyzer 320 may extract the words "what", "schedule" and "today" from the voice command and the command executor 350 may refer to a schedule application installed in the electronic device 100 based on the analyzed result of the voice analyzer 320 to generate an actual response and an intelligent response to the voice command.

Likewise, the text analyzer 330 may analyze a text command from the user of the electronic device and the image analyzer 340 may analyze an image input made by the user of the electronic device 100 to generate an actual response and an intelligent response to the command.

Although the FIG. 3 shows various hardware components of the processor 110 but it is to be understood that other embodiments are not limited thereon. In other embodiments, the processor 110/210 may include less or more number of components. Further, the labels or names of the components are used only for illustrative purpose and does not limit the scope of the disclosure. One or more components can be combined together to perform same or substantially similar function to provide the surreal response in the electronic device 100.

Figure 4:
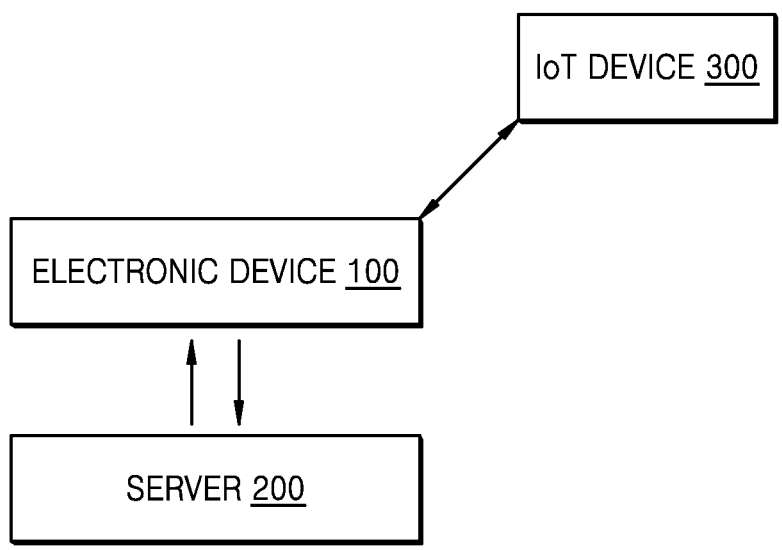
FIG. 4 illustrates a block diagram for providing an intelligent response to a command, according to an embodiment of the disclosure.

FIG. 4 illustrates a block diagram for providing an intelligent response to a command, according to an embodiment of the disclosure.

Referring to FIG. 4, the system may include the server 200 communicated with the electronic device 100. The electronic device 100 may receive the command from the user and transmit the command and request of an intelligent response to the server 200. In response to the command and request of an intelligent response, the server 200 may analyze the command and dynamically generate a feedback specific to the command, wherein the feedback imitate characteristics of the command received from the electronic device 100.

The electronic device 100 may generate an actual response which is specific to the command and an intelligent response which includes certain effects corresponding to the command and/or the actual response by itself. Once the electronic device 100 determines that the actual response includes a control signal to control an IoT device 300 based on the content of the command the electronic device transmits the control signal to the IoT device 300. For example, if the electronic device 100 receives the command of "Open the door" from a user, the electronic device 100 may generate the actual response including a control signal for opening the door and the intelligent response including sound effects of "door opening". The control signal for opening the door may be transmitted to an IoT device 300 which controls opening and closing the door.

Figure 5:
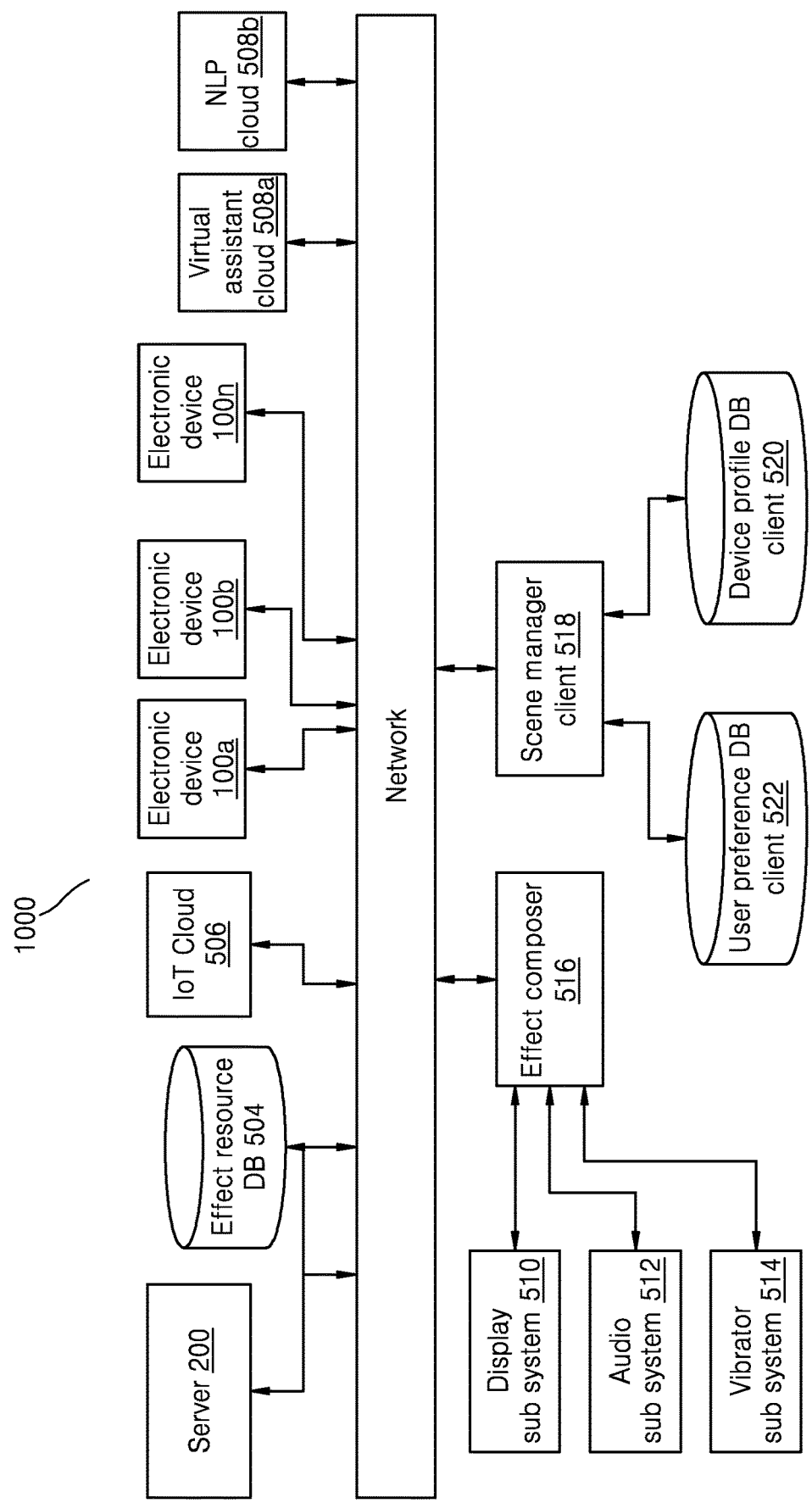
FIG. 5 is an overview of a system providing an intelligent response to a command, according to an embodiment of the disclosure.

FIG. 5 is an overview of the system providing an intelligent response to a command, according to an embodiment of the disclosure.

Referring to FIG. 5, the system 1000 includes a set of electronic devices 100a-100n, the server 200, a virtual assistant cloud 508a, a natural language parser (NLP) cloud 508b, an effect resource database (DB) 504, an IoT Cloud 506, a display subsystem 510, an audio subsystem 512, a vibrator subsystem 514, an effect composer 516, a scene manager client 518, a device profile DB client 520 and a user preference DB client 522. All the operations and functions of the electronic device 100a through 100n and the server 200 are explained in conjunction with the FIGS. 1 through 4. The effect resource DB 504 comprises the audio effect, the visual effect, the physical effect, the audio-visual effect, and the audio-visual-physical effect. The IoT cloud 506 manages all operations among the electronic device 100a-100n and the server 200 using the virtual assistant cloud 508a. The effect composer 516 may communicate with the display subsystem 510, the audio subsystem 512, and the vibrator subsystem 514. The effect composer 516 produces the various effects (e.g., audio effect, visual effect, physical effect, audio-visual effect, audio-visual-physical effect or the like) using the display subsystem 510, the audio subsystem 512, and the vibrator subsystem 514. The scene manager client 518 may communicate with the command executor 350, the user preference DB client 522 and the device profile DB client 520.

Figure 6:
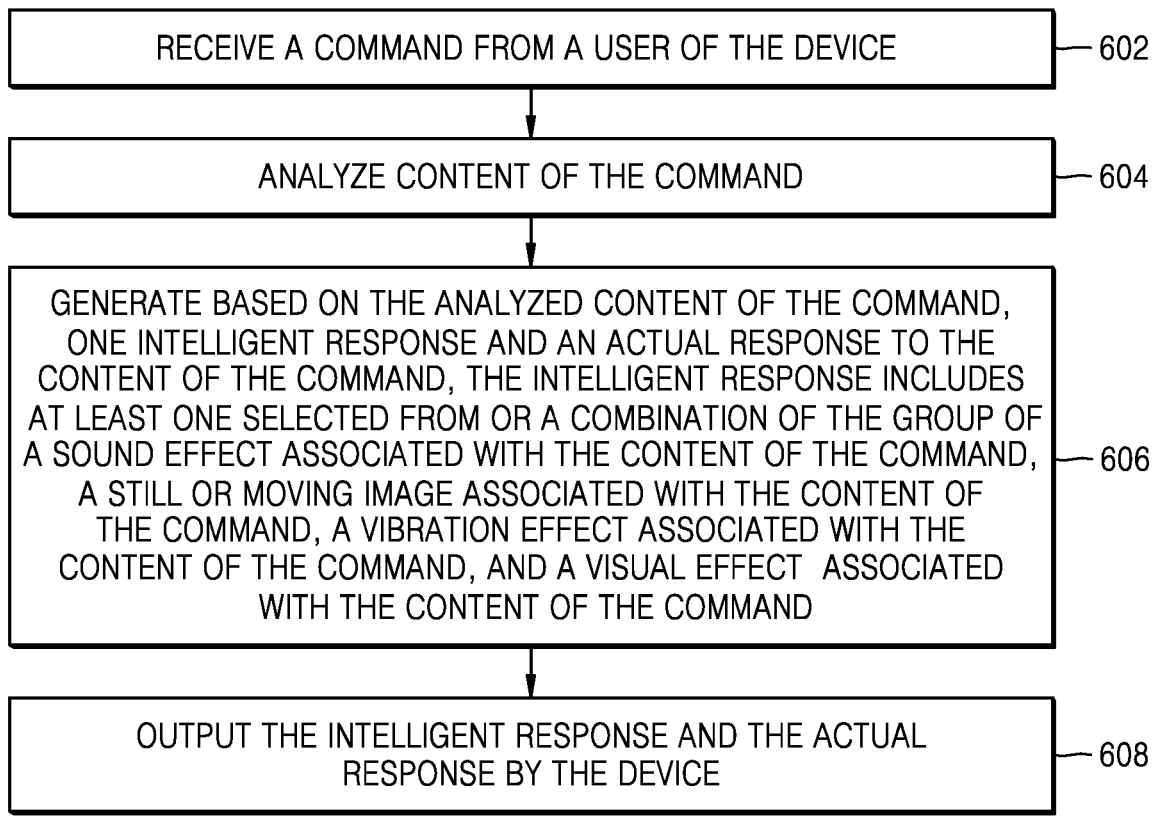
FIG. 6 is a flowchart illustrating a method of providing an intelligent response, according to an embodiment of the disclosure.

FIG. 6 is a flowchart illustrating a method of providing an intelligent response, according to an embodiment of the disclosure.

Referring to FIG. 6, the operations of 602 through 608 may be performed by the processor 110.

At operation 602, the processor 110 of the electronic device may receive a command from a user of the electronic device 100. The command may be any kind of user inputs using the electronic device. That is the command may be a voice command, a text command, or a touch input command. A capturing of an image may be another form of the command.

At operation 604, the processor 110 may analyze the content of the command. For example, the voice command of "open the window" is received, the processor 110 may control a voice analyzer 320 to recognize and analyze the content of the voice command. The processor 110 determines that the user wants to open the window based on the analysis result and the processor 110 generates an intelligent response which is contextually associated with the content of the command and an actual response to the content of the command at operation 606. For example, the processor 110 may generate a sound effect of opening the window as the intelligent response based on the analyzed content of the command or the processor 110 may generate a moving picture which depicts opening the window displayed on the display 140 of the electronic device 100. The actual response may be a control signal transmitted to a window controller and the window controller may open the window based on the control signal.

The intelligent response may be at least one selected from or a combination of the group of a sound effect associated with the content of the command, a vibration effect associated with the content of the command, a still or moving image associated with the content of the command, and a visual effect associated with the content of the command.

At operation 608, the electronic device 100 may output the intelligent response and the actual response including the control signal as described above.

The various actions, acts, blocks, operations, or the like in the flow diagram of FIG. 6 may be performed in the order presented, in a different order or simultaneously. Further, in some embodiments, some of the actions, acts, blocks, operations, or the like may be omitted, added, modified, skipped, or the like without departing from the scope of the disclosure.

Figure 7:
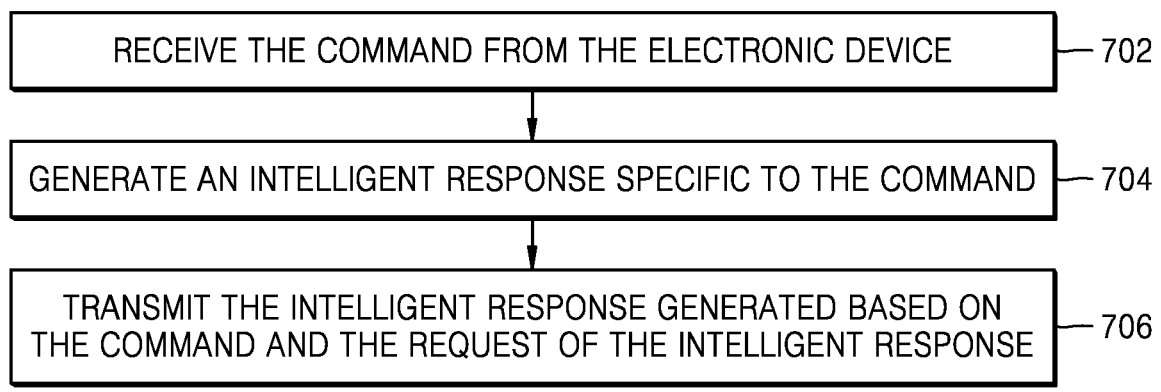
FIG. 7 is a flowchart illustrating another method of generating an intelligent response by the server, according to an embodiment of the disclosure.

FIG. 7 is a flowchart illustrating another method of generating an intelligent response by the server 200, according to an embodiment of the disclosure.

Referring to FIG. 7, the operations 702 through 706 may be performed by the processor 210.

At operation 702, the server 200 may receive the command from the electronic device 100. The server 200 may receive a request of an intelligent response along with the command from the electronic device 100.

At operation 704, the processor 210 of the server 200 may generate an intelligent response and an actual response specific to the command. The actual response may contain any information or a control signal which enables the electronic device 100 to take certain actions corresponding to or in response to the command. In an embodiment, the actual response may be generated by the electronic device 100.

At operation 706, the server 200 transmits the intelligent response generated based on the command and the request of the intelligent response. The server 200 may obtain information regarding the command and corresponding intelligent response from a database (DB) connectable via a network.

The various actions, acts, blocks, operations, or the like in the flowchart of FIG. 7 may be performed in the order presented, in a different order or simultaneously. Further, in some embodiments, some of the actions, acts, blocks, operations, or the like may be omitted, added, modified, skipped, or the like without departing from the scope of the disclosure.

Figure 8:
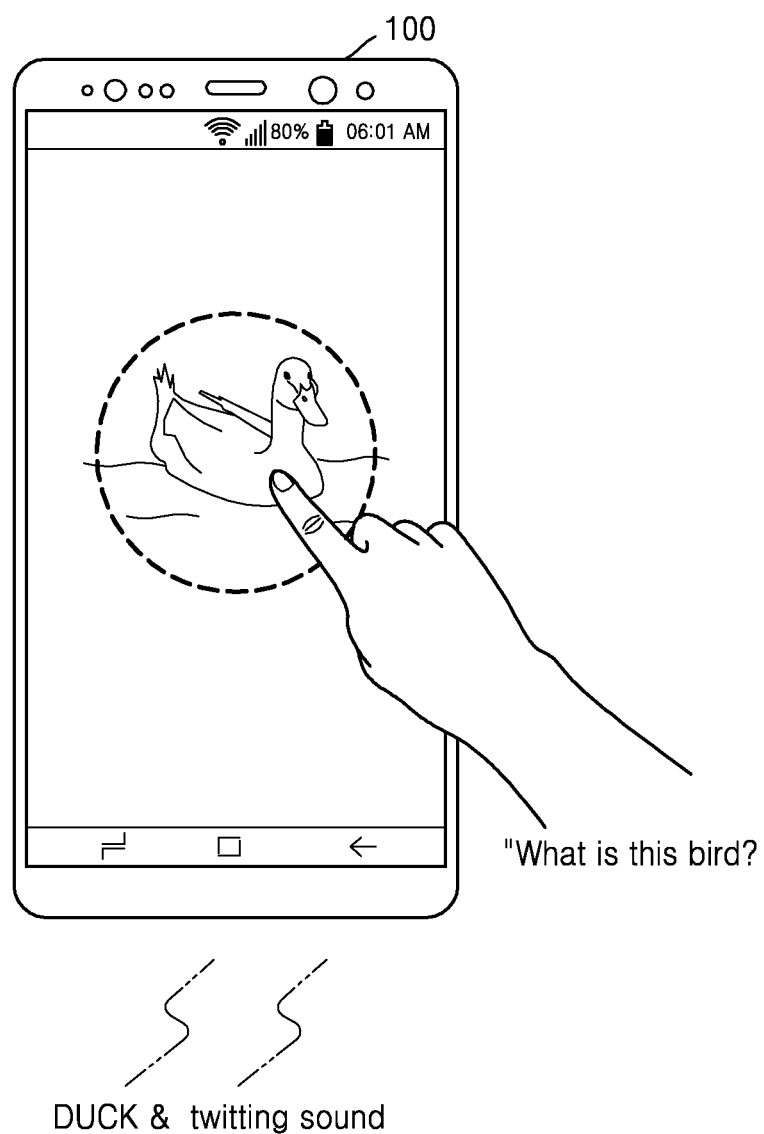
FIG. 8 illustrates an example scenario providing an intelligent response to an inquiry, according to an embodiment of the disclosure.

FIG. 8 illustrates an example scenario providing an intelligent response to an inquiry, according to an embodiment of the disclosure.

Referring to FIG. 8, the user may select an object in the image displayed on the electronic device 100. The object appears to be a bird and the user wants to know the name of the bird. Thus, the user inputs a voice command of an inquiry—"What is this bird?" The electronic device 100 may receive the voice command including the inquiry and the processor 110 may analyze the shape and the features of the image and search an internet or a network for the bird having similar image to obtain the name. If the search result indicates that the image corresponds to a duck, the electronic device 100 may generate an actual response of "the bird is a duck" and an intelligent response of duck twitting sound. If the electronic device 100 determines that the duck twitting sound is not available in the memory 130 of the electronic device 100, the electronic device 100 may search the internet for the duck twitting sound and obtain the duck twitting sound.

Once the electronic device 100 obtains the duck twitting sound, the electronic device 100 may output the actual response and the intelligent response to the user.

Figure 9:
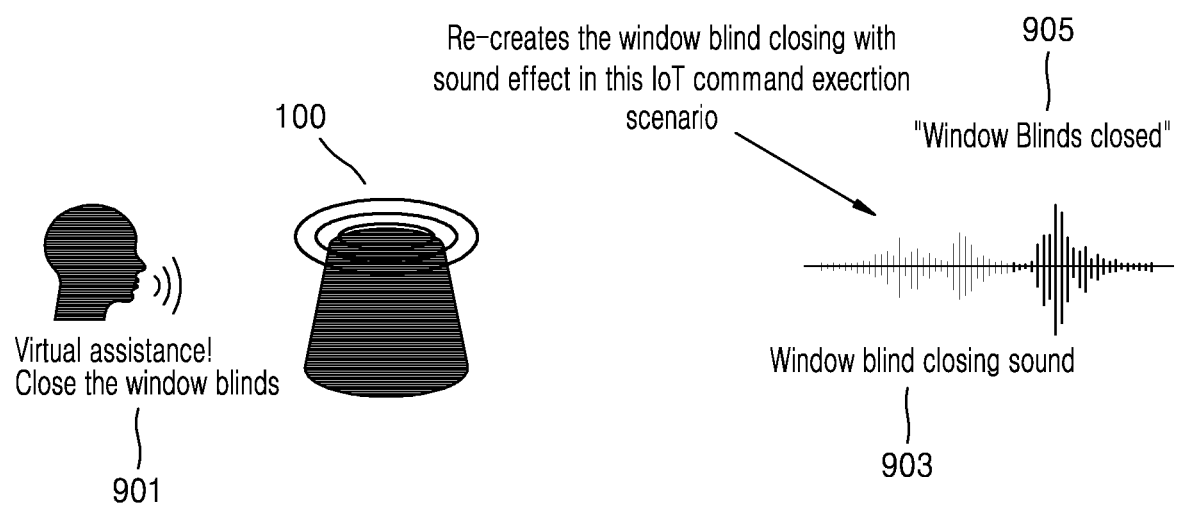
FIG. 9 illustrates an example scenario of providing an intelligent response with a sound effect, according to an embodiment of the disclosure.

FIG. 9 illustrates an example scenario of providing an intelligent response with a sound effect, according to an embodiment of the disclosure.

Referring to FIG. 9, the user may provide a command of "Close the window blinds" at operation 901. While executing the command or once the command is executed make special intelligent effects using capabilities of the electronic device 100, the electronic device 100 creates the intelligent response including at least one of the audio only effect, the audio-visual effect, and the audio-visual-physical effect for closing the window blind. The intelligent response may mimic characteristics of the command being executed or may also include the characteristics of the electronic device on which the command is being executed or may recreate the context associated with the actual response or may be purely imaginary (is not unconditional). Further, the system 1000 decides when to create the intelligent response and when not to create the intelligent response. In an example, the system 1000 may generate an actual response including a control signal for the window blind closing with the intelligent response having sound effects of closing the window blind based on the user presence nearby the electronic device 100. The user may hear the sound effect of closing the window blind while the actual window blind is closed at operations 903 and 905.

Figure 10:
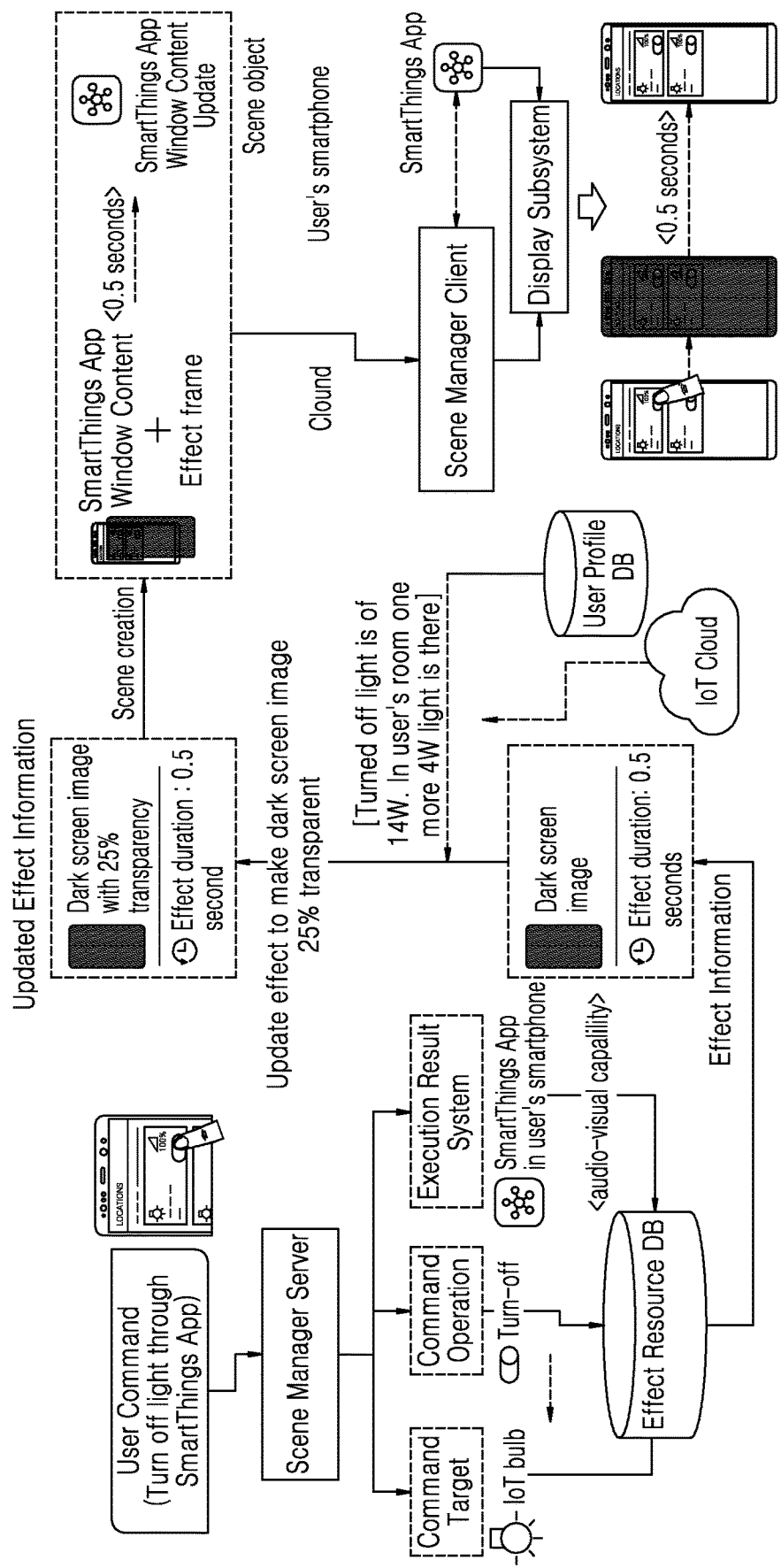
FIG. 10 illustrates an example scenario of controlling light operations, according to an embodiment of the disclosure.

FIG. 10 illustrates an example scenario of controlling light operations, according to an embodiment of the disclosure.

Referring to FIG. 10, there is an IoT bulb in a room. The user provides the command of "Turn off the bulb". Based on the command, the electronic device 100 identifies that the command operation is "turning off light". Further, the electronic device identifies the effect from a database (DB) connectable via an internet. While switching off the bulb, a display of the electronic device 100 is controlled to be dimmed to match the relative brightness (e.g., 30%) of a bed room.

Figure 11:
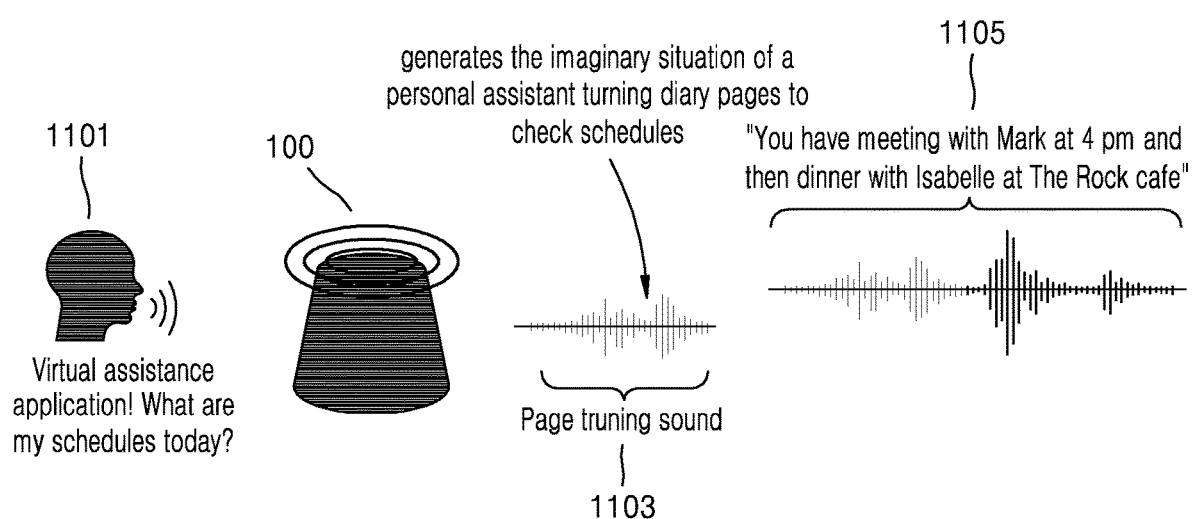
FIG. 11 illustrates an example illustration in which an intelligent response associated with schedules is provided, according to an embodiment of the disclosure.

FIG. 11 illustrates an example illustration in which an intelligent response associated with schedules is provided, according to an embodiment of the disclosure.

Referring to FIG. 11, a user of the electronic device 100 may input a voice command as "What are my schedules today?" to a virtual assistance of the electronic device 100 at operation 1101.

At operation 1103, the electronic device 100 analyzes the content included in the voice command and recognizes that the user would like to know today's schedule. The electronic device 100 may generate sound effects of turning over diary or calendar pages to check schedules in the diary or the calendar. After outputting the generated sound effects, the electronic device 100 may provide a response of "You have a meeting with Mark at 4 P.M. and then have a dinner with Isabelle at The Rock cafe" at operation 1105. After or when outputting the response of stating today's schedule as above, the electronic device may output another sound effects including café sounds based on the analysis of the content of the schedule which includes "dinner at the Rock Café." The electronic device 100 may connect to the server 200 over the IoT cloud 506 for the server 200 to generate the intelligent response. That is, the electronic device 100 may transmit to the server request of the intelligent response based on the analyzed content included the command and receive the intelligent response generated by the server referring to the analyzed content.

Figure 12:
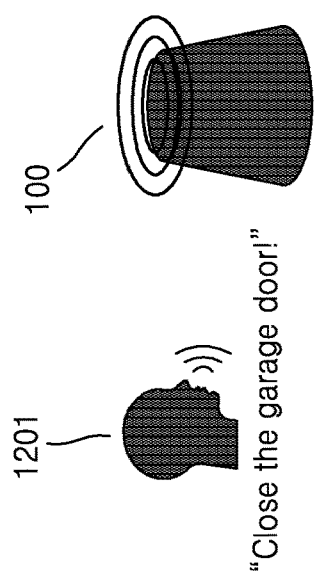
FIG. 12 illustrates an example scenario in which an intelligent response associated with a door is provided, according to an embodiment of the disclosure.
Figure 12:
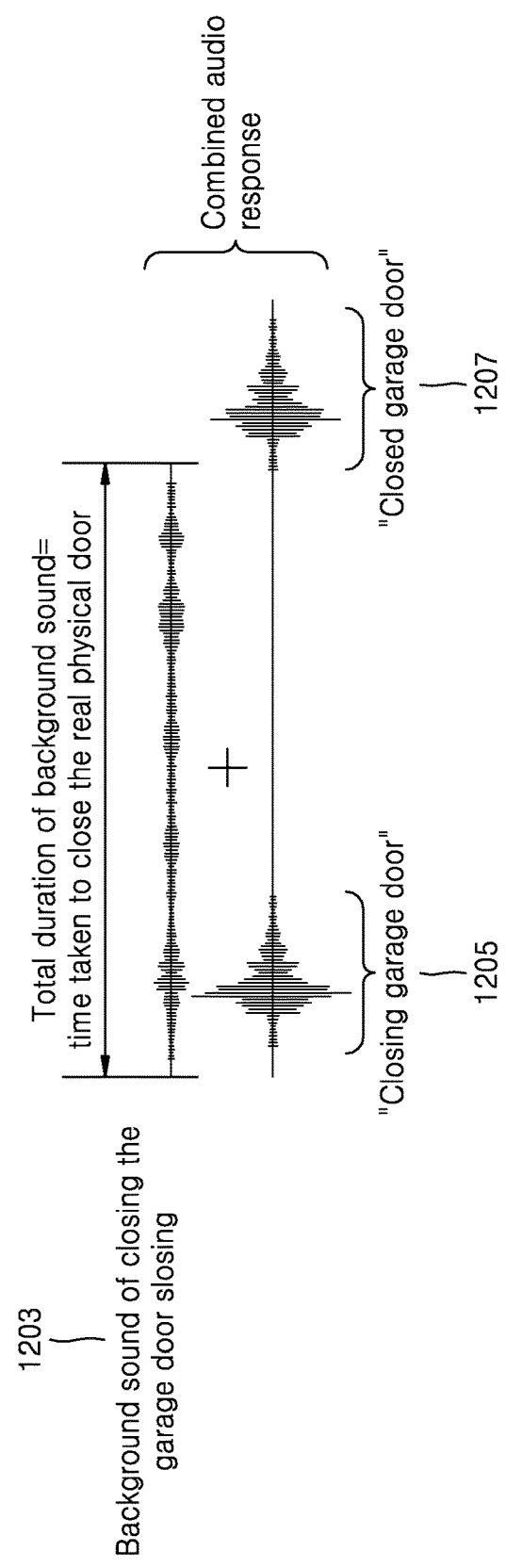

FIG. 12 illustrates an example scenario in which an intelligent response associated with a door is provided, according to an embodiment of the disclosure.

Referring to FIG. 12, the user provides a voice command if "Close the garage door" at operation 1201. At operation 1203, the electronic device 100 may generate, based on the analysis of the content of the command, an intelligent response which includes background sound of closing the garage door. At operation 1205, the electronic device may output a control command as an actual response to the user command. The control command may control the garage door to be closed by transmitting a door close signal to a remote device such as the garage door controller (not shown). The sound effects of closing the garage door may be maintained until the garage door controller completes the closing of the garage door. The remote device may be any of IoT devices according to various embodiments of the disclosure.

At operation 1207, the electronic device 100 may output a response of "Garage door closed" when the electronic device 100 determines that the closing the garage door is completed. The determination may be made based on a response signal received from the garage door controller (not shown). The response of "Garage door closed" may be a voice response, a text response or a combination thereof.

In an embodiment, the electronic device 100 which receives the command of "closing the garage door" may be a smart speaker, but the electronic device 100 cannot decide what effects to be generated. The electronic device may be assisted by the server 200. The server 200 may determine the effect based on the received content of the command generate an appropriate intelligent response including the effect based on the received content of the command.

Figure 13:
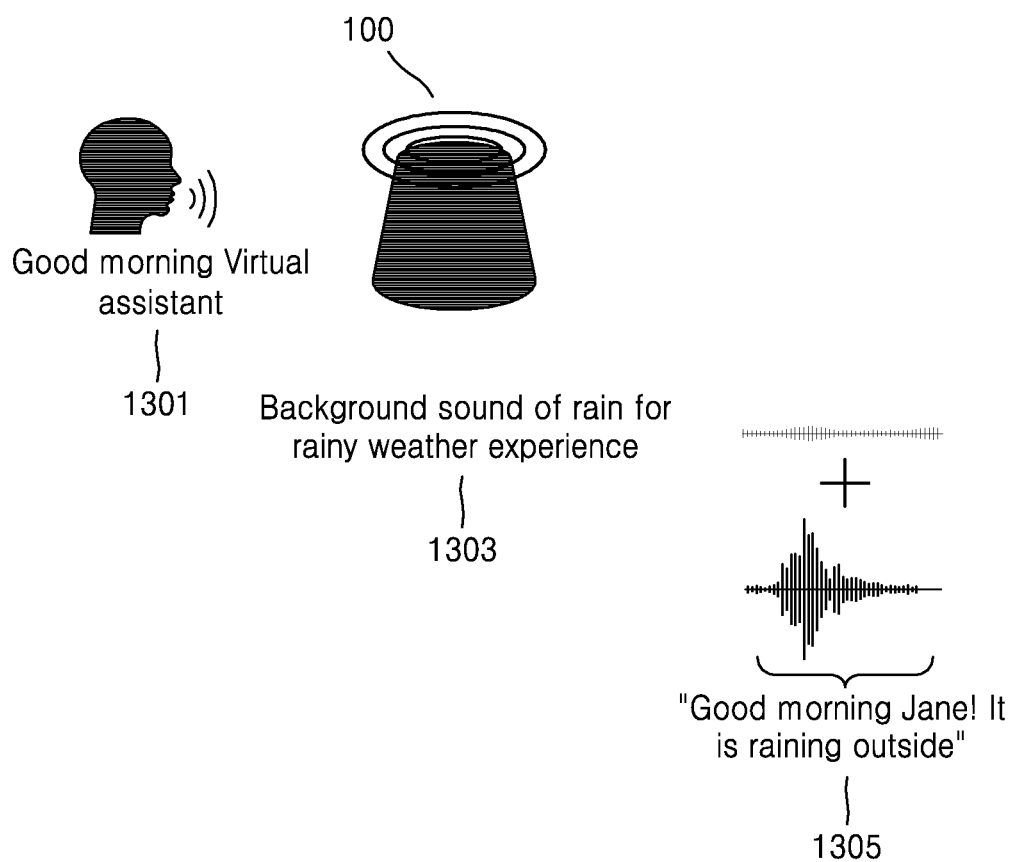
FIG. 13 illustrates an example scenario in which an intelligent response associated with weather is provided, according to an embodiment of the disclosure.

FIG. 13 illustrates an example scenario in which an intelligent response associated with weather is provided, according to an embodiment of the disclosure.

Referring to FIG. 13, the user provides a command of "Good morning virtual assistant"! at operation 1301. The electronic device 100 may analyze the content of the command and determine that the content is related to a greeting in the beginning of a day. Then, the electronic device may determine that the user needs weather information based on the analysis of the content of the command. At operation 1305, the electronic device may provide a response of "Good morning Jane! It is raining outside" by referring to a weather application which provides weather information. At operation 1303, at the same time while providing the response, the electronic device 100 may provide background rain sound generated based on the analysis of the content of the command and the weather information obtained from the weather application. In an embodiment, the weather information may be obtained from a weather application installed in the server 200.

Figure 14:
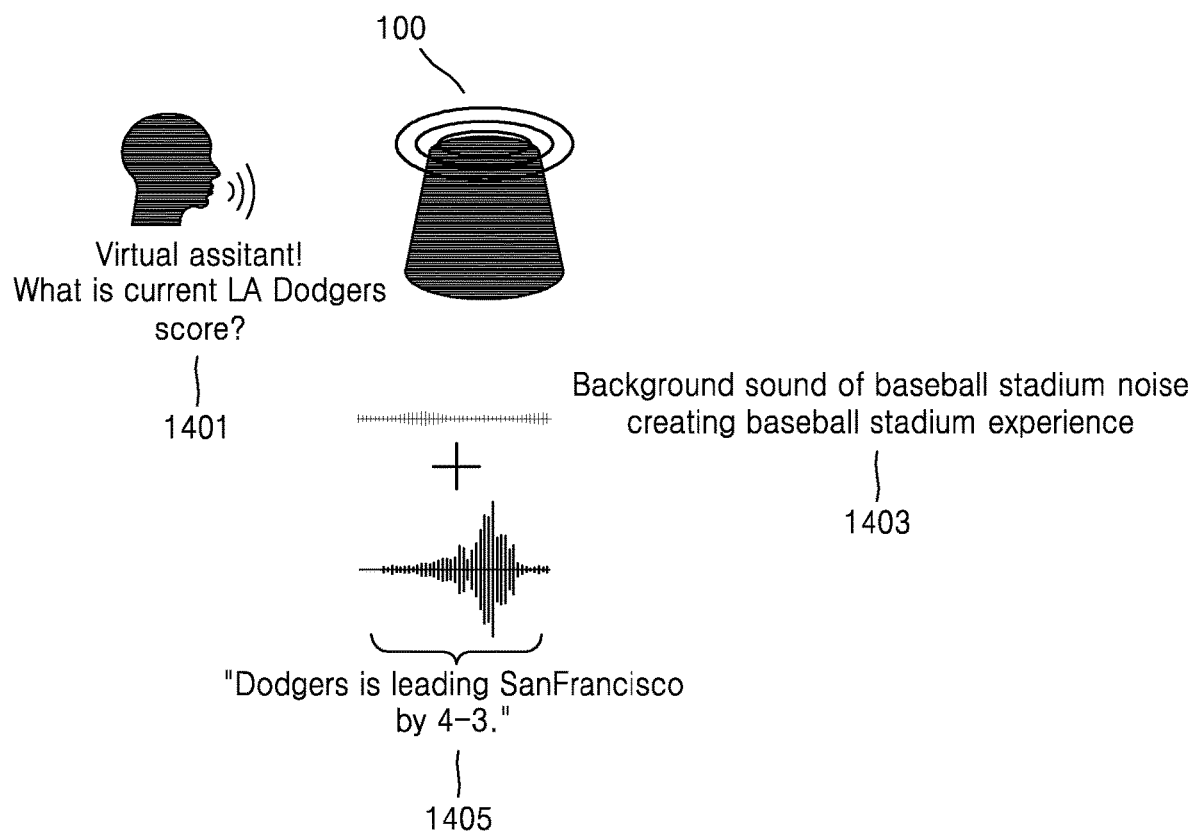
FIG. 14 illustrates an example scenario in which an intelligent response associated with sports event is provided, according to an embodiment of the disclosure.

FIG. 14 illustrates an example scenario in which an intelligent response associated with sports event is provided, according to an embodiment of the disclosure.

Referring to FIG. 14, at operation 1401, the user provides a voice command of "virtual assistant! What is current LA dodgers score?" The processor 110 may analyze the content of the command and extract meaningful words and phrases such as "LA Dodgers" and "score" after processing the voice command with the voice analyzer 320. The processor 110 determines that the user wants to know the baseball score of LA Dodgers and obtains major league baseball information including the live score of LA Dodgers as actual response via a network. The major league baseball information includes the current score of LA Dodgers which shows that LA Dodgers 4: 3 San Francisco Giants. Then the processor 110 may generate an intelligent response which includes background sound effect of baseball stadium noise based on the determination that LA Dodgers is one of baseball teams at operation 1403. The processor 110 may generate, based on the major league baseball information, an actual response which includes the information that "LA Dodgers is leading San Francisco by 4-3" at operation 1405. The intelligent response may be a voice output via the speaker of the electronic device 100 and the actual response may be a voice output via the speaker or a text output displayed on the display 140 of the electronic device 100.

Figure 15:
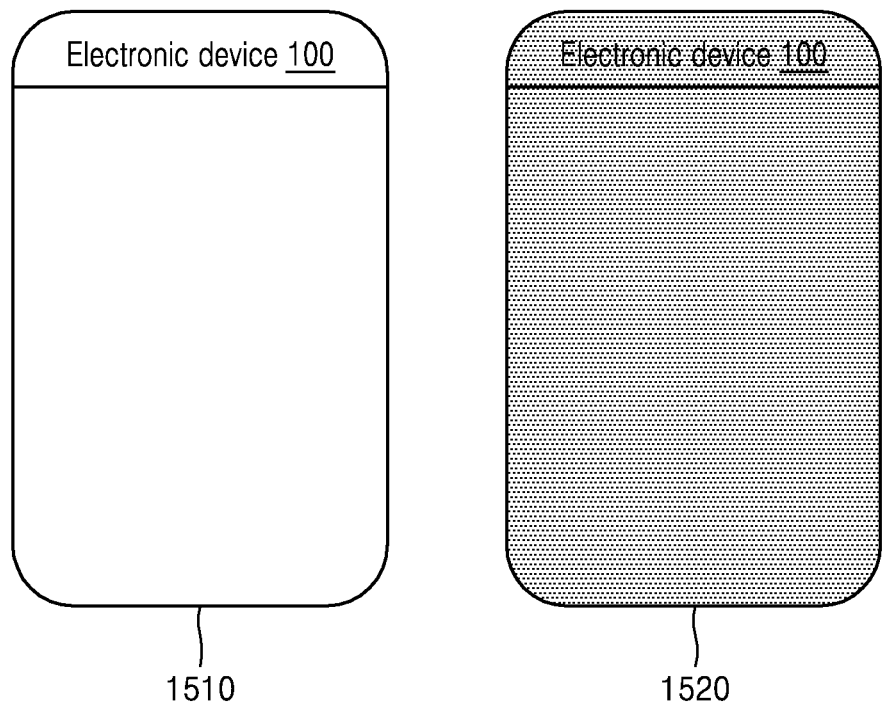
FIG. 15 illustrates an example scenario in which an intelligent response associated with light on/off is provided, according to an embodiment of the disclosure.

FIG. 15 illustrates an example scenario in which an intelligent response associated with light on/off is provided, according to an embodiment of the disclosure.

Referring to FIG. 15, the brightness of the display is changed from a normal state 1510 to a dimmed state 1520 in response to a command of turning off light. The user may provide a voice command of turning off light. Based on the user's voice command, the display screen becomes dark as an intelligent response generated based on the analysis of the user's voice command.

Figure 16:
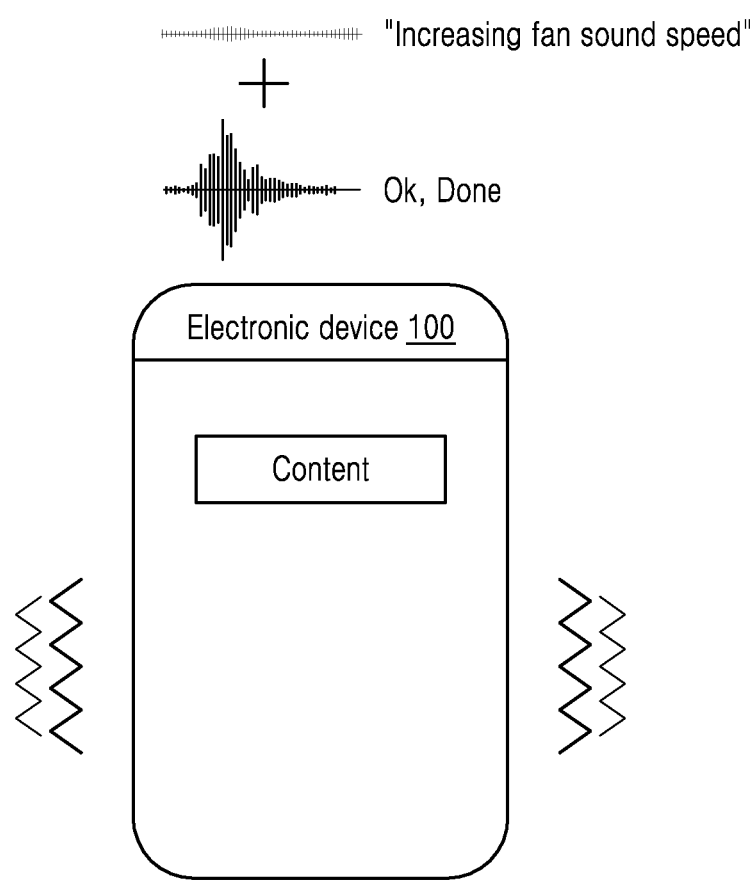
FIG. 16 illustrates an example scenario in which an intelligent response associated with fan speed is provided, according to an embodiment of the disclosure.

FIG. 16 illustrates an example scenario in which an intelligent response associated with fan speed is provided, according to an embodiment of the disclosure.

Referring to FIG. 16, a user provides a command of "increase fan speed" via the virtual assistant of the electronic device 100. In response to the command, the electronic device 100 may generate a control signal to control a fan device to increase the fan speed. While increasing the fan speed, a combination of intelligent response may be outputted. For example, an animation of fan blowing appears on the display 140 along with breeze sound and feeble vibration to imitate increased fan speed using the augmentable virtual effect.

The degree of vibration, the fan speed illustrated by the animation and the volume of the breeze sound of the electronic device 100 may increase proportional to the fan speed.

FIG. 17 illustrates an example scenario in which an intelligent response associated with playing a song is provided, according to an embodiment of the disclosure.

Referring to FIG. 17, the user requests the electronic device 100 to play a song (e.g., Yesterday by Beatles) in background while browsing an internet. Based on the request, the processor 110 searches the network or the memory 130 for the song (using a music service available) and starts playback of the song in the background while browsing the internet.

While the disclosure has been shown and described with reference to various embodiments thereof, it will be understood by those skilled in the art that the various changes in form and details may be made therein without departing from the spirit and scope of the disclosure as defined by the appended claims and their equivalents.

What is claimed is:

1. A method of providing an intelligent response on an electronic device, the method comprising:
   receiving a command from a user of the electronic device;
   identifying content of the command based on analyzing the command;
   generating, based on the content of the command, a control signal corresponding to an actual response responsive to the command;
   generating at least one intelligent response contextually associated with the content of the command and the actual response, the at least one intelligent response including a sound effect associated with the content of the command, the sound effect including content which mimics a physical action of an action being performed remotely from the electronic device by the control signal corresponding to the actual response;
   determining, with at least one GPS, a location of the electronic device relative to a location of at least one remote device performing the physical action in response to the control signal from the electronic device; and
   outputting the at least one intelligent response including the sound effect at the electronic device and the control signal,
   wherein the sound effect is maintained until the completion of the physical action, and
   wherein the outputting the sound effect comprises outputting the sound effect with a first volume based on a determination that the electronic device is located within a first distance from the at least one remote device and outputting the sound effect with a second volume which is larger than the first volume based on a determination that the electronic device is located a second distance which is relatively longer than the first distance from the at least one remote device.

2. The method of claim 1, wherein the command comprises at least one of a voice command, a text command, a touch input command or an image input captured by a capturing device of the electronic device.

3. The method of claim 1, wherein the outputting of the at least one intelligent response and the control signal comprises outputting the at least one intelligent response and the control signal in a temporal order or simultaneously.

4. The method of claim 1, wherein the generating of the at least one intelligent response comprises:
   transmitting, to a server, a request of the at least one intelligent response and the analyzed command; and
   receiving the at least one intelligent response from the server.

5. The method of claim 1, wherein the control signal corresponding to the actual response is transmitted to the at least one remote device for controlling, in response to the command, the at least one remote device.

6. The method of claim 1,
   wherein the generating of the at least one intelligent response comprises generating the at least one intelligent response further based on information associated with the command, and
   wherein the information being obtained from an application is installed in the electronic device or a server connected to the electronic device.

7. The method of claim 1, wherein the at least one intelligent response further includes a visual effect associated with the content of the command, the visual effect comprising a visual effect of changing a brightness of a display of the electronic device based on the content of the command.

8. The method of claim 1, wherein the at least one intelligent response further includes a visual effect associated with the content of the command, the visual effect comprising a text output associated with the content of the command.

9. The method of claim 1, further comprising:
   moving an image associated with the content of the command,
   wherein the moving of the image comprises moving one or more images depicting the content of the command.

10. The method of claim 1, wherein the analyzing of the command comprises obtaining information associated with the command from a database via a network.

11. The method of claim 1, wherein the at least one intelligent response further comprises a visual effect, the visual effect comprising displaying a still or a moving image associated with the content of the command.

12. The method of claim 1, wherein the generating of the at least one intelligent response comprises searching a network for first data required to generate the at least one intelligent response and generating the at least one intelligent response based on the first data.

13. The method of claim 12, wherein the generating of the control signal corresponding to the actual response comprises searching the network for second data required to generate the control signal and generating the control signal corresponding to the actual response based on the second data.

14. An apparatus for providing an intelligent response, the apparatus comprising:
   a display;
   a GPS sensor;
   a speaker; and
   at least one processor configured to:
      receive a command from a user,
      identify content of the command based on analyzing the command,
      generate, based on the content of the command, a control signal corresponding to an actual response responsive to the command,
      generate at least one intelligent response contextually associated with the content of the command and the actual response, the at least one intelligent response including a sound effect associated with the content of the command the sound effect including content which mimics a remote physical action of an action being performed remotely from the apparatus by the control signal corresponding to the actual response,
      determine, with the GPS sensor, a location of the apparatus relative to a location of at least one remote device performing the physical action in response to the control signal from the apparatus, and
      output the at least one intelligent response including sound effect at the apparatus and the control signal,
   wherein the sound effect is maintained until the completion of the physical action, and
   wherein the outputting the sound effect comprises outputting the sound effect with a first volume based on a determination that the apparatus is located within a first distance from the at least one remote device and outputting the sound effect with a second volume which is larger than the first volume based on a determination that the apparatus is located a second distance which is relatively longer than the first distance from the at least one remote device.

15. The apparatus of claim 14, wherein the at least one processor is further configured to:
  transmit, to a server, a request of the at least one intelligent response and the analyzed command; and
  receive the at least one intelligent response generated by the server.

16. The apparatus of claim 14, wherein the at least one intelligent response further comprises a visual effect associated with the content of the command, the visual effect comprising a visual effect of changing a brightness of the display of the apparatus based on the content of the command.

17. The apparatus of claim 16, wherein the at least one processor is further configured to transmit, to at least one illumination device, a signal to change the brightness of the at least one illumination device proportional to the visual effect of changing the brightness of the display of the apparatus based on the content of the command.

18. The apparatus of claim 14, wherein the at least one processor is further configured to search a network for first data required to generate the at least one intelligent response and generate the intelligent response based on the first data.

19. The apparatus of claim 18, wherein the at least one processor is further configured to search the network for second data required to generate the control signal corresponding to the actual response and generate the control signal based on the second data.

20. A non-transitory computer program product comprising a computer readable storage medium having a computer readable program stored therein, the computer readable program, when executed on an electronic device, causing the electronic device to:
  receive a command from a user of the electronic device;
  identify content of the command based on analyzing the command;
  generate, based on the content of the command, a control signal corresponding to an actual response responsive to the command;
  generate at least one intelligent response contextually associated with the content of the command and the actual response, the at least one intelligent response including a sound effect associated with the content of the command, the sound effect including content which mimics a physical action of an action being performed remotely from the electronic device by the control signal corresponding to the actual response;
  determine, with at least one GPS, a location of the electronic device relative to a location of at least one remote device performing the physical action in response to the control signal from the electronic device; and
  output the at least one intelligent response including the sound effect at the electronic device and the control signal,
  wherein the sound effect is maintained until the completion of the physical action, and
  wherein the outputting the sound effect comprises outputting the sound effect with a first volume based on a determination that the electronic device is located within a first distance from the at least one remote device and outputting the sound effect with a second volume which is larger than the first volume based on a determination that the electronic device is located a second distance which is relatively longer than the first distance from the at least one remote device.

* * * * *